(12) United States Patent
Kozlowski (10) Patent No.: US 8,235,829 B2
(45) Date of Patent: Aug. 7, 2012

(54) CONSTANT VELOCITY JOINT

(75) Inventor: Keith A. Kozlowski, Lynn Haven, FL (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 91 days.

(21) Appl. No.: 12/715,863

(22) Filed: Mar. 2, 2010

(65) Prior Publication Data
US 2011/0059802 A1 Mar. 10, 2011

Related U.S. Application Data

(60) Provisional application No. 61/156,704, filed on Mar. 2, 2009.

(51) Int. Cl.
*F16D 3/221* (2006.01)
(52) U.S. Cl. .......................... 464/141; 464/906
(58) Field of Classification Search .................. 464/111, 464/139, 141, 906
See application file for complete search history.

(56) References Cited

U.S. PATENT DOCUMENTS

| | | | |
|---|---|---|---|
| 1,103,716 A * | 7/1914 | Wallbillich | 464/141 |
| 1,763,206 A | 6/1930 | Woveris | |
| 3,296,830 A | 1/1967 | Runkle | |
| 4,019,347 A | 4/1977 | Krude | |
| 4,224,808 A | 9/1980 | Gehrke | |
| 4,472,159 A | 9/1984 | Krude | |
| 4,556,400 A | 12/1985 | Krude et al. | |
| 4,611,373 A | 9/1986 | Hazebrook | |
| 4,685,897 A * | 8/1987 | Krude | 464/141 |
| 4,753,626 A | 6/1988 | Hazebrook et al. | |
| 4,832,657 A | 5/1989 | Hahn | |
| 5,230,659 A | 7/1993 | Bird et al. | |
| RE34,341 E | 8/1993 | Fukumura et al. | |
| 5,267,905 A * | 12/1993 | Wenzel et al. | 464/141 |
| 6,264,568 B1 | 7/2001 | Frazer et al. | |
| 6,280,338 B1 | 8/2001 | Hayama et al. | |

(Continued)

FOREIGN PATENT DOCUMENTS

| | | |
|---|---|---|
| FR | 1218118 A | 5/1960 |
| GB | 1596837 | 9/1981 |
| WO | 8809445 A1 | 1/1988 |

OTHER PUBLICATIONS

Universal Joint and Driveshaft Design Manual. Warrendale, PA; Society of Automotive Engineers, 1979. p. 167-170. TJ1059.S62.*

(Continued)

*Primary Examiner* — Gregory Binda
*Assistant Examiner* — Josh Skroupa
(74) *Attorney, Agent, or Firm* — Cantor Colburn LLP (57) ABSTRACT

A constant velocity joint is disclosed that includes a first rotatable shaft, the first shaft comprising an axle portion having on one end an enlarged pocket portion, the pocket portion having a plurality of circumferentially and radially spaced ball pockets and a distal end; a corresponding plurality of spherical balls disposed in the pockets; and a second rotatable shaft comprising a joint housing, the joint housing having a central bore with a corresponding plurality of axially extending, circumferentially and radially spaced ball grooves disposed about the second longitudinal axis and a base, the joint housing disposed over the pocket portion with the corresponding plurality of balls disposed in the grooves, the joint providing a range of angular and axial movement of the first shaft relative to the second shaft, the distal end of the pocket portion having a convex surface configured to provide a predetermined a range of angular movement.

20 Claims, 7 Drawing Sheets

U.S. PATENT DOCUMENTS

| | | |
|---|---|---|
| 6,537,045 B2 | 3/2003 | Riegger et al. |
| 6,685,571 B1 | 2/2004 | Smith |
| 6,910,970 B2 | 6/2005 | Kobayashi |
| 7,624,819 B1 * | 12/2009 | LeBlanc et al. ............... 464/139 |
| 7,690,999 B2 | 4/2010 | Nozaki et al. |
| 2005/0272510 A1 | 12/2005 | Nakagawa et al. |
| 2007/0161428 A1 | 7/2007 | Nakao et al. |
| 2009/0156319 A1 | 6/2009 | Mondragon et al. |

OTHER PUBLICATIONS

E.R. Wagner, P.E., "Basic Requirements for Constant Velocity Universal Joints" Universal Joint and Driveshaft Design Manual, AE-7, Society of A Automotive Engineers, Inc., Warrendale, PA pp. 99-101, TJ1079, S62 1979.

* cited by examiner

CONSTANT VELOCITY JOINT

CROSS-REFERENCES TO RELATED APPLICATIONS

This patent application claims priority to U.S. Provisional Patent Application Ser. No. 61/156,704 filed Mar. 2, 2009, which is incorporated herein by reference in its entirety.

FIELD OF THE INVENTION

The subject invention generally relates to universal joints, and more particularly to constant velocity (CV) joints, and even more particularly, to CV joints having stroke limitation and angle limitation.

BACKGROUND

Constant velocity joints are typically employed in automotive axial drive shafts, and especially in front-wheel-drive vehicles between the transaxle differential and the driving wheel. They are used to transmit torques at various speeds, angles and telescopic positions between a first shaft and second shaft.

There are many types of CV joints. One CV joint configuration includes a rotatable first shaft that has an axle portion and a pocket end disposed at an end of the axle portion. The first shaft is rotatable about a first longitudinal axis. The pocket end is disposed within a joint housing that is disposed on an end of a second shaft. The second shaft is rotatable about a second longitudinal axis. The joint housing includes a plurality of grooves disposed within a central bore and extending along the second longitudinal axis. The pocket end includes a diameter transverse to the first longitudinal axis that is greater than a diameter of the axle portion of the first shaft. The pocket end defines a plurality of semi-spherical pockets that are circumferentially and radially disposed about the first longitudinal axis in a configuration that is complementary relative to the plurality of grooves. As such, the number of pockets is equal to the number of grooves. The CV joint includes a plurality of spherical drive balls with one drive ball rotatably disposed within each pocket and corresponding groove. The pocket end and first shaft are moveable and may be articulated or stroked axially relative to the second shaft. As the CV joint is articulated (i.e., as the second shaft is moved relative to the first shaft by axial stroking or angulation) the drive balls roll back and forth along the grooves and rotate within the pockets.

A common axle shaft configuration for rear wheel drive drivetrain systems includes the use of stroking CV joints, as described above, to provide both an inboard and an outboard CV joint associated with a common axle shaft. In this configuration, the axle shaft is capable of floating between the inboard CV joint and the outboard CV joint because neither of the inboard CV joint nor the outboard CV joint fixes the axial position of the axle shaft. As such, the axle shaft is free to float inwards or outwards toward the inboard CV joint or the outboard CV joint, respectively. The axle shaft may float into one of the inboard CV joint or the outboard CV joint a stroke distance, the stroke distance being the maximum amount of axial travel or stroke permitted by the CV joint. When the axle shaft is in a fully-stroked position relative to one of the inboard CV joint or the outboard CV joint, the range of articulation for that CV joint is reduced and/or limited. This is because the axle shaft usually includes a flat end surfaces located adjacent to the pockets at the pocket ends upon which the axle shaft may rest against the housings (i.e., the axle shaft may bottom out against one of these flat surfaces). Accordingly, the flat surface prevents or hinders articulation of the axle shaft relative to the housing when the axle shaft is in the fully-stroked position. If the axle shaft is in the fully-stroked position and is required to articulate an amount beyond the small range of angular movement that the joint is capable of in this position, the range of articulation may be exceeded and joint failure or damage is possible.

In addition to the limitation described above, the stroking CV joints described above that have a flat distal end are restricted to operating within a given range of articulation. If the first shaft and the second shaft articulate beyond this range of articulation, then it is possible for one or more of the drive balls to become dislodged from within its pocket. Once dislodged, the drive ball becomes trapped within the housing, between the housing and the pocket end, thereby causing the CV joint to fail. Other different styles of CV joints prevent over-articulation by utilizing an outer edge of the housing as a limiter against which the second shaft abuts, thereby limiting the range of articulation. However, in the inexpensive type of stroking CV joint described above, the geometric shape of the various components render this solution cost prohibitive, and thereby impracticable.

Accordingly, there remains a need to limit the range of articulation in ball-in-socket stroking CV joints, such as described above, in order to prevent ejection of one or more of the drive balls, as well as a need to provide a greater range of articulation of these joints when they are fully stroked inwardly into the housing.

SUMMARY OF THE INVENTION

In one exemplary embodiment of the present invention, a CV joint is provided. The CV joint includes a first rotatable shaft having a first longitudinal axis, the first shaft comprising an axle portion having on one end thereof an enlarged pocket portion, the pocket portion having a plurality of circumferentially and radially spaced ball pockets formed therein and a distal end. The CV joint also includes a corresponding plurality of spherical balls disposed in the ball pockets. The CV joint further includes a second rotatable shaft having a second longitudinal axis and comprising a joint housing disposed on an end thereof. The joint housing has a central bore with a corresponding plurality of axially extending, circumferentially and radially spaced ball grooves disposed therein about the second longitudinal axis and a base. The joint housing is disposed over the pocket portion with the corresponding plurality of balls disposed in the ball grooves, thereby forming a joint that is configured to provide a range of angular movement and a range of axial movement of the first shaft relative to the second shaft. The distal end of the pocket portion has a convex surface that is configured to provide a predetermined a range of angular movement when the joint is fully stroked inwardly and the distal end is in touching contact with the base.

In another exemplary embodiment of the present invention, a CV joint is provided. The CV joint includes a first rotatable shaft having a first longitudinal axis, the first shaft comprising an axle portion having on one end thereof an enlarged pocket portion, the pocket portion having a plurality of circumferentially and radially spaced ball pockets formed therein, a distal end and an extension that extends a cross-sectional profile of the pocket portion from a distal side of the ball pockets to the distal end. The CV joint also includes a corresponding plurality of spherical balls disposed in the ball pockets. The CV joint further includes a second rotatable shaft having a second longitudinal axis and comprising a joint housing disposed on an end thereof, the joint housing having a central bore with a corresponding plurality of axially extending, circumferentially and radially spaced ball grooves disposed therein about the second longitudinal axis and a base. The joint housing is disposed over the pocket portion with the corresponding plurality of balls disposed in the ball grooves, thereby forming a moveable joint that is configured to provide a range of angular movement and a range of axial movement of the first shaft relative to the second shaft, wherein the extension has a length from a ball pocket center to the distal end that provides a predetermined range of axial movement of the joint and the extension provides a predetermined range of angular movement of the joint over the predetermined range of axial movement.

The above features and advantages and other features and advantages of the present invention are readily apparent from the following detailed description of the best modes for carrying out the invention when taken in connection with the accompanying drawings.

BRIEF DESCRIPTION OF THE DRAWINGS

Other objects, features, advantages and details appear, by way of example only, in the following detailed description of embodiments, the detailed description referring to the drawings in which:

FIG. 5 is a partial cross-sectional view of a second exemplary embodiment of a CV joint as disclosed herein in an articulated configuration.

DESCRIPTION OF THE EMBODIMENTS

The following description is merely exemplary in nature and is not intended to limit the present disclosure, application or uses. It should be understood that throughout the drawings, corresponding reference numerals indicate like or corresponding parts and features.

There are various applications where it is desirable to improve the articulation performance of stroking CV joints that incorporate a first rotatable shaft that includes an axle portion and an enlarged pocket portion that has a plurality of circumferentially and radially spaced ball pockets formed therein and a corresponding plurality of spherical balls disposed in the ball pockets. These CV joints further include a second rotatable shaft having a second longitudinal axis and comprising a joint housing disposed on an end thereof. The joint housing has a central bore with a corresponding plurality of axially extending, circumferentially and radially spaced ball grooves disposed therein about the second longitudinal axis and a base. The joint housing is disposed over the pocket portion with the corresponding plurality of balls disposed in the ball grooves, thereby forming a joint that is configured to provide a range of angular movement and a range of axial movement of the first shaft relative to the second shaft. One improvement that has been realized is an improvement of the articulation or angulation performance of CV joints when they are fully stroked inwardly, particularly when the distal end of the enlarged pocket portion is in contact with the base of the housing. This improvement has been realized by providing that the distal end of the pocket portion has a convex surface that is configured to provide a predetermined a range of angular movement when the joint is fully stroked inwardly and the distal end is in touching contact with the base. All manner of convex surfaces may be utilized as disclosed herein. Another improvement that has been realized in accordance with an exemplary embodiment as disclosed herein is an improvement in the articulation performance along the entire range of axial movement of the joint. This improvement has been realized by providing an extension that has a length from a ball pocket center to the distal end that limits the stroke of the joint and provides a predetermined range of axial movement, and a predetermined range of angular movement of the joint over the predetermined range of axial movement. All manner of extensions may be utilized as disclosed herein.

Referring to the Figures, a CV joint is shown generally at 20. The CV joint 20 is configured to transmit torque between a first end 35 of first shaft 22 and a second shaft 24 at various rotational speeds, joint angles ($\alpha$) and telescopic axial positions. In an exemplary embodiment, a second CV joint (not shown) may also be coupled to a second end (not shown) of first shaft and configured to transmit torque between first shaft 22 and a third shaft (not shown) at various speeds, angles and telescopic positions. The use of a first shaft 22 that is configured for use with CV joint 20, and may also be configured for use with a second CV joint, may be used in any suitable application requiring transmission of torque along a series of shafts, and is particularly suited for use in automotive axial drive shafts, and is especially useful in the drivetrain of front-wheel-drive vehicles between the transaxle differential and the driving wheels as inboard and outboard CV joints. However, it should be appreciated that the CV joint 20, or a first shaft 22 that includes first CV joint 20 and a second CV joint (not shown), may be utilized in other situations in which a torque must be transmitted between shafts that articulate (i.e., move relative to each other, particularly those where the shafts may be angulated or telescoped, or both, relative to one another). It will also be appreciated that first CV joint 20 and second CV joint may have the same size and joint configuration or a different size and joint configuration. Since the second CV joint may be identical to CV joint 20 and could be illustrated as a mirror image thereof on first shaft 22, the description of CV joint 20 herein is equally applicable to the second CV joint and first shaft 22, and separate illustration has not been provided.

Figure 1:
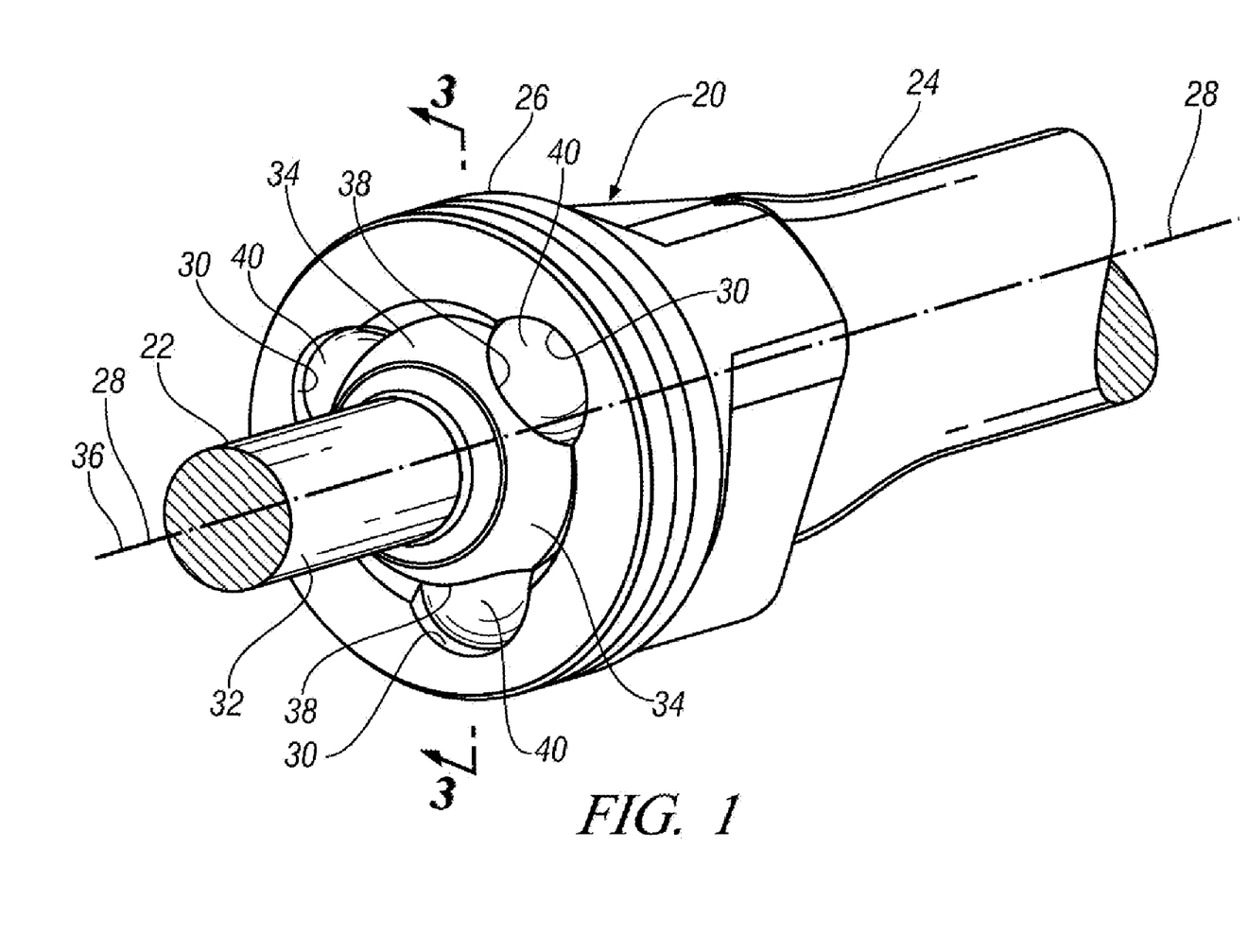
FIG. 1 is a perspective view of an exemplary embodiment of a CV joint as disclosed herein.
Figure 2:
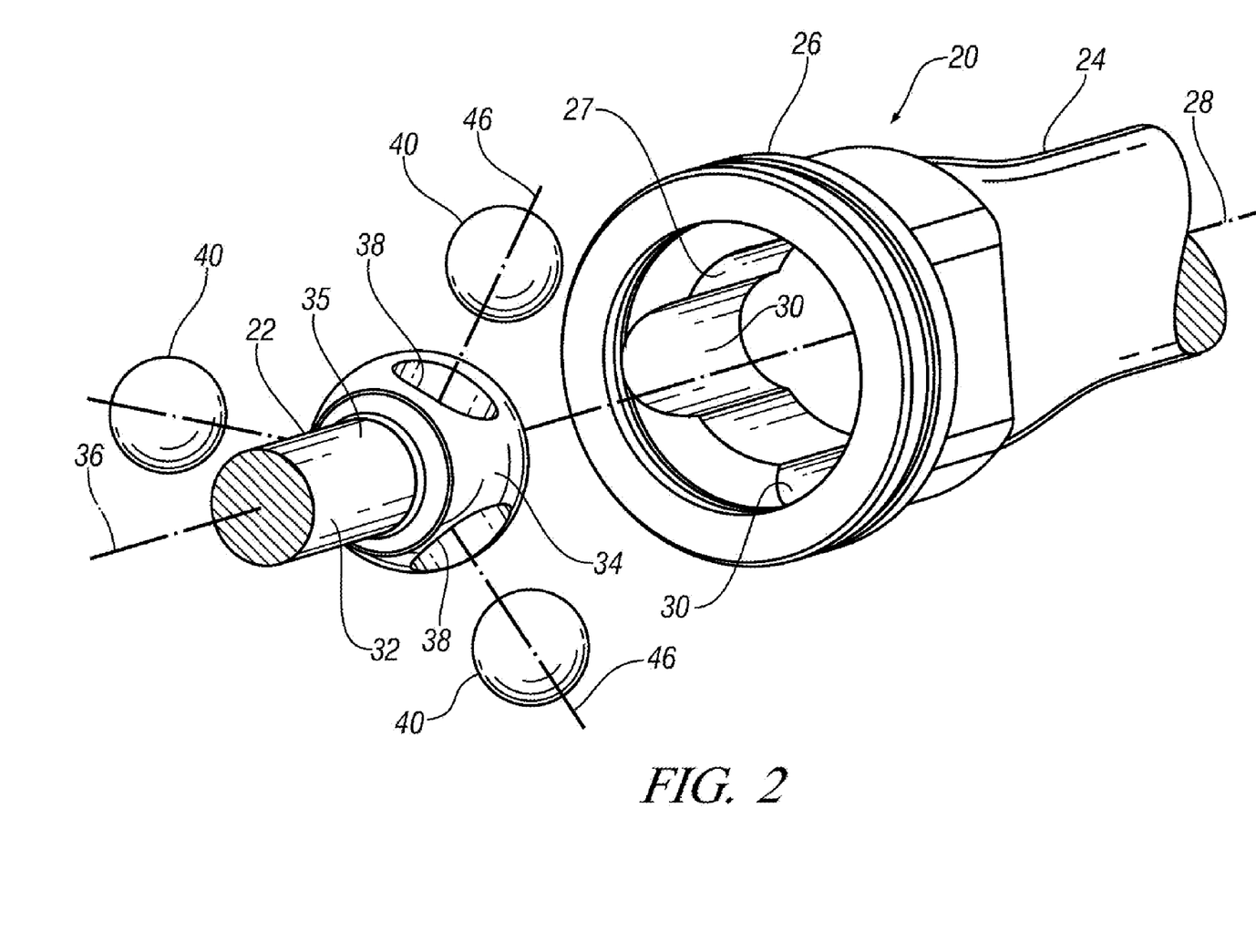
FIG. 2 is a disassembled perspective view of the CV joint of FIG. 1.
Figure 3:
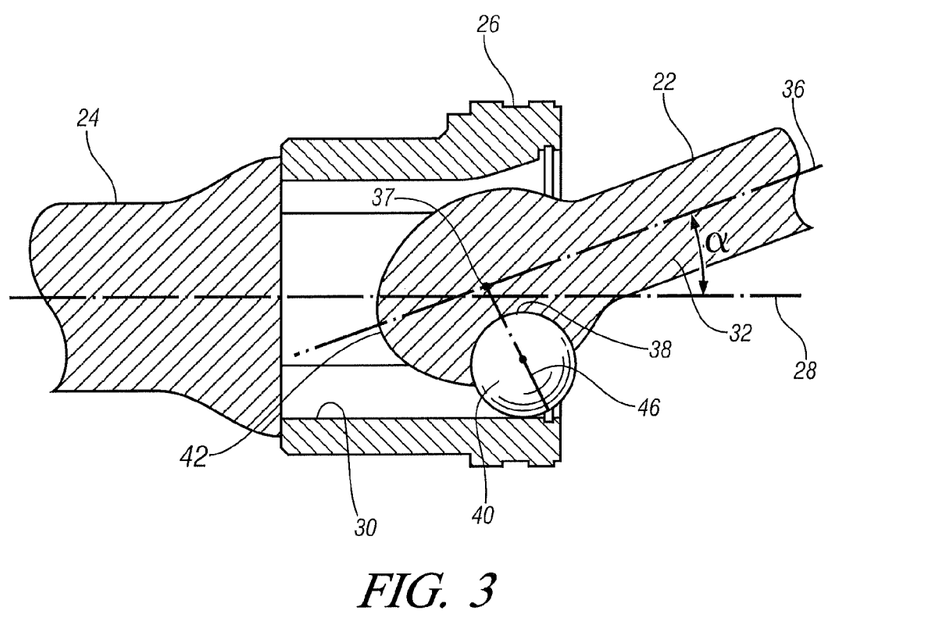
Figure 4A:
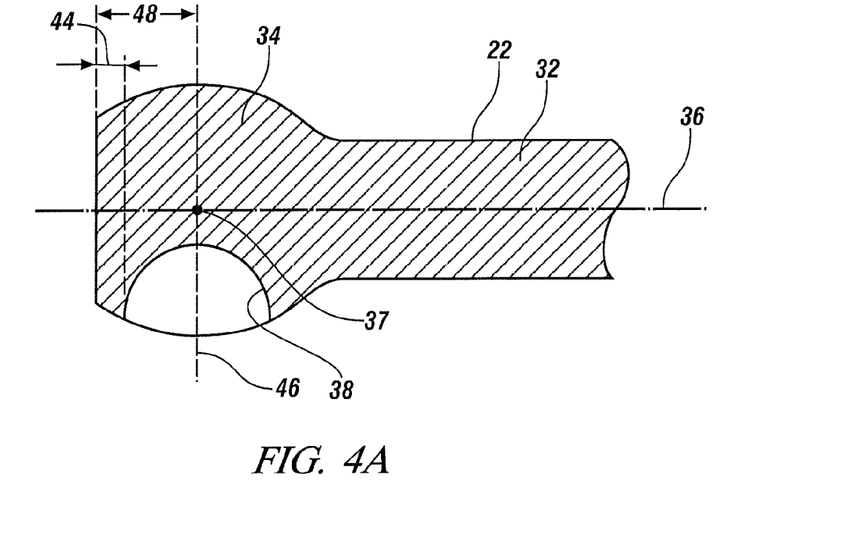
FIGS. 4A-G are cross-sectional views of exemplary embodiments of various enlarged pocket end configurations as disclosed herein.
Figure 4B:
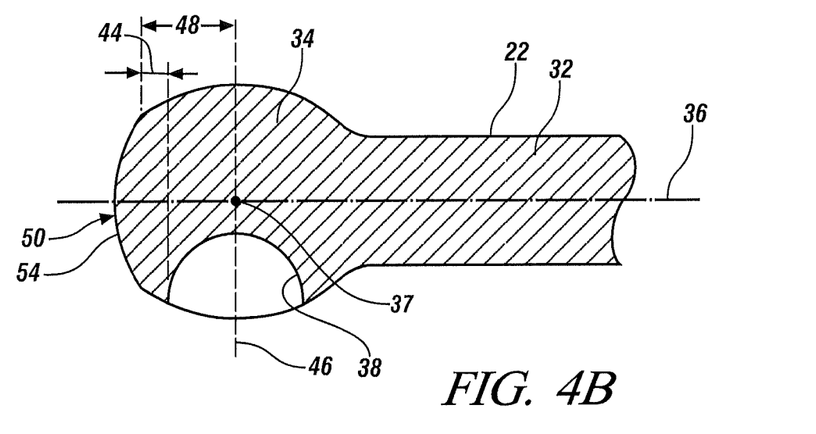
Figure 4C:
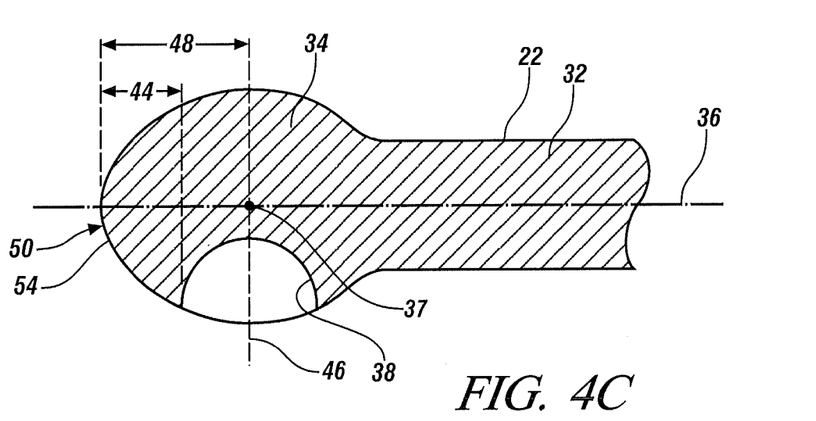
Figure 4D:
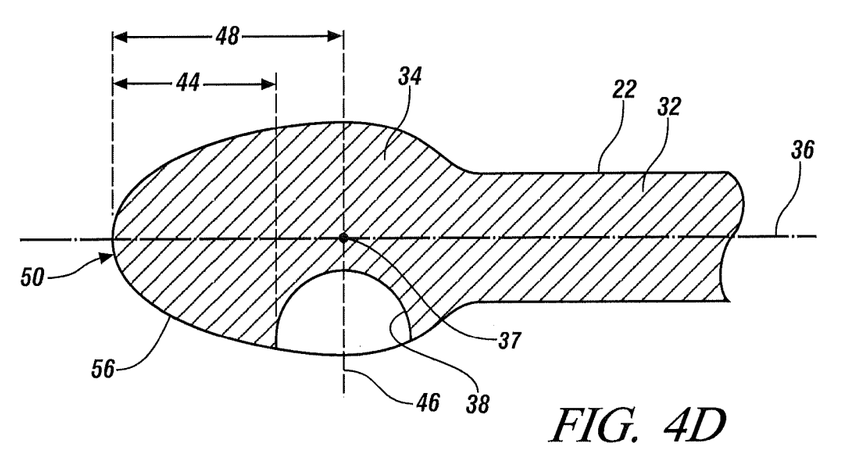
Figure 4E:
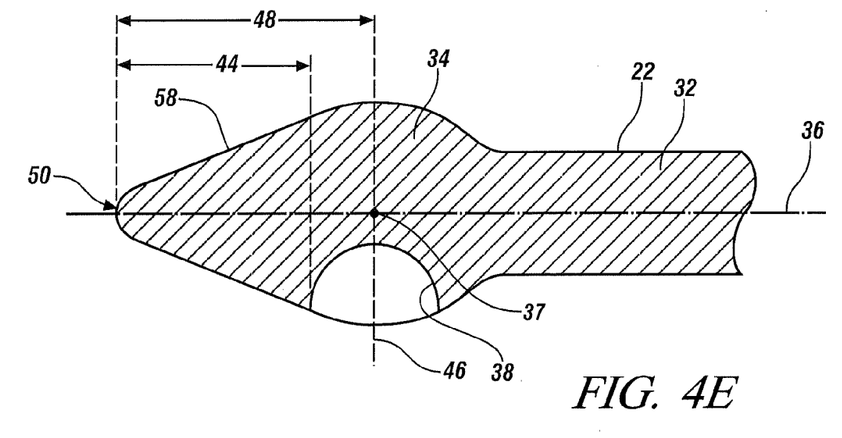
Figure 4F:
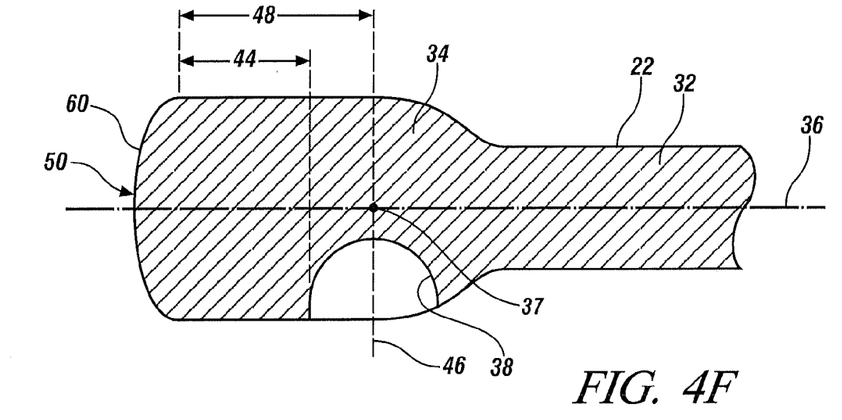
Figure 4G:
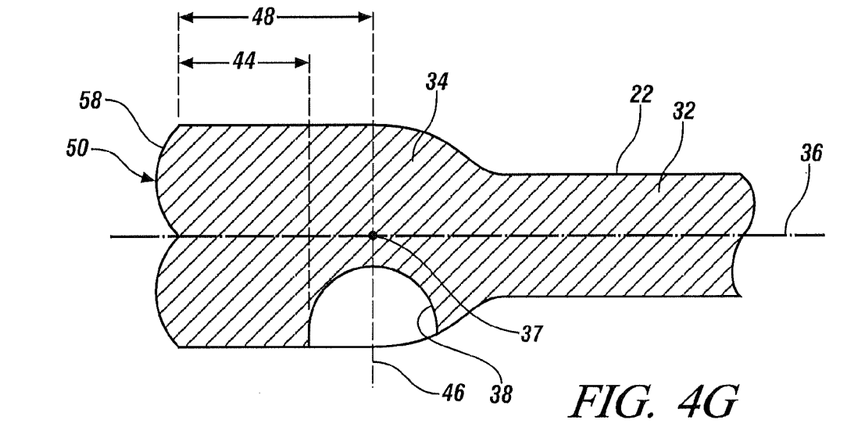

As illustrated in FIGS. 1-3, the second shaft 24 includes a joint housing 26 disposed at one end of the second shaft 24. Second shaft 24 may be of any suitable shaft configuration, including solid, hollow and partially hollow shaft configurations. The second shaft 24 is rotatable about a second longitudinal axis 28. The joint housing 26 includes a plurality of radially and circumferentially spaced grooves 30 disposed within an inner bore 27 of the joint housing 26. The grooves 30 extend along the second longitudinal axis 28. As shown, the joint housing 26 defines three grooves 30 radially and circumferentially spaced about the second longitudinal axis 28 both radially and circumferentially equidistant from each other (i.e., spaced 120 degrees apart from each other about the second longitudinal axis 28). However, it should be appreciated that the joint housing 26 may define some other number of grooves 30, such as 4, 6, 8 or more grooves 30, if design considerations so require.

The first shaft 22 includes an axle portion 32 and on one end an enlarged pocket end portion 34, such as a first pocket end 34 in the exemplary embodiment of FIGS. 1-3. In an exemplary embodiment, the first shaft 22 may also include an enlarged second pocket end portion (not shown) on an opposite end of first shaft 22. First shaft 22 may be of any suitable shaft configuration, including solid, hollow (not shown) and partially hollow (not shown) shaft configurations. The first pocket end 34 is disposed proximate a first end 35 of the axle portion 32, within the first joint housing 26 of the second shaft 24. The first pocket end 34 is moveable relative to the second shaft 24, this includes telescoping or axial movement and angular movement through joint angle ($\alpha$). The first shaft 22 is rotatable about a first longitudinal axis 36. The first pocket end 34 defines a plurality of first pockets 38 radially and circumferentially disposed about the first longitudinal axis 36 in complementary orientation relative to the plurality of first grooves 30. As such, the number of first pockets 38 is equal to the number of first grooves 30. As shown, the number of first pockets 38 is equal to three, with the three first pockets 38 radially and circumferentially spaced about the first longitudinal axis 36 equidistant from each other, i.e., the three first pockets 38 are radially spaced 120 degrees apart from each other about the first longitudinal axis 36. It should be appreciated that the number of first pockets 38 may differ from that shown and described herein, but is equal to the number of first grooves 30 defined by the first joint housing 26. Furthermore, as the first shaft 22 rotates about the first longitudinal axis 28 and the CV joint 20 articulates (i.e., as the first shaft 22 articulates relative to the second shaft 24, the drive balls 40 roll along the grooves 30 and rotate within the pockets 38).

The CV joint 20 includes a plurality of drive balls 40, with one of the drive balls 40 rotatably disposed within one of the pockets 38 and also disposed within one of the grooves 30. In other words, each of the drive balls 40 is partially disposed within one of the pockets 38 and partially disposed within one of the grooves 30 opposing the pocket 38. Drive balls 40 may have any suitable configuration. In an exemplary embodiment, drive balls 40 may be spherical. The drive balls 40 are configured to transmit torque between the second shaft 24 and the first shaft 22 as they move within joint housing 28. This includes rotational movement as the second shaft 24 is rotated about the second longitudinal axis 28 and first shaft 22 is rotated about first longitudinal axis 36. It also includes movement associated with articulation of first shaft 22, second shaft 24 and CV joint 20. As first shaft 22 and second shaft 24 are angulated relative to one another the drive balls 40 are configured to roll along the grooves 30 and rotate within the pockets 38. It also includes telescoping axial movement associated with axial translation of first shaft 22 relative to second shaft 24. As first shaft 22 moves axially relative to second shaft 24, the drive balls 40 are configured to roll along the grooves 30 and rotate within the pockets 38. Joint 20 is configured to provide any of these movements individually or simultaneously, including simultaneous rotational, angular and axial movement.

The first pocket end 34 of the first shaft 22 is radially enlarged relative to the axle portion 32 of the first shaft 22 and may be configured to radially accommodate the pockets 38. Accordingly, the first pocket end 34 of the first shaft 22 includes a diameter transverse to the first longitudinal axis 36 that is greater than a diameter of the axle portion 32 of the first shaft 22 transverse to the first longitudinal axis 36. In other words, the first pocket end 34 of the first shaft 22 is larger than the axle portion 32 of the first shaft 22. In an exemplary embodiment, first pocket end 34 may be partially spherical.

As illustrated in FIGS. 3 and 4A-4G, in an exemplary embodiment, the first pocket end 34 of the first shaft 22 includes a distal end surface 42 on first pocket end 34. The distal end surface 42 extends generally transverse to the first longitudinal axis 36. The distal end surface 42 may include any suitable convex surface 50 (FIGS. 4A-4G), including various three-dimensionally curved surface shapes. Suitable three dimensional surfaces include various, elliptical surfaces 52 (FIGS. 4A-4C), spherical surfaces 54 (FIGS. 4B and 4F), parabolic surfaces 56 (FIG. 4D), or convex surfaces of complex curvature 58 (FIGS. 4E and 4G) comprising curved paths formed from a combination of an arc or a line revolved about the first longitudinal axis 36, or a combination of the foregoing surfaces. However, it will be appreciated that other regular or irregular three-dimensional curved surfaces are also possible.

The convex surface 50 may be selected and located to obtain the desired effect on the articulation, including angular movement and axial movement or stroke, of first shaft 22 relative to second shaft 24. This may include, for example, selection of the degree and type of curvature of convex surface 50. It may also include, for example, the axial location of convex surface 50 relative to balls 40 and ball pockets 38, as measured, for example, from the ball pocket center 37 and pocket center line 46. For example, the curvature associated with convex surface 50 may be arranged so that it begins directly from the ball pockets 38 as is the case with exemplary parabolic surface 56. Alternately, it may be arranged so that the convex curvature is displaced or extended so that it begins away from the ball pockets 38 as is the case with spherical surface 60 that has been extended away from the pockets 38, as measured, for example, from the ball pocket center 37 and pocket center line 46, by an extension from the ball pockets, such as a cylindrical extension 44 having a predetermined axial length 48, as illustrated in FIG. 4. In addition to the axial location of the convex surface 50 and the location at which the convex curvature begins, the nature of the convex surface 50 and the degree of curvature will effect, for example, the axial location of the apex of the convex surface. For example, spherical surface 54 and convex surface of complex curvature 58 begin at the same axial location, but the degree of curvature of the spherical surface 54 is less such that the apex of the spherical surface 54 is axially closer to the ball pocket center 37 and pocket center line 46. The convex curve 50 comprising distal end surface 42 may include an apex. As illustrated in the embodiments of FIGS. 4A-4F, the apex may be located on the first longitudinal axis 36. Alternately, the apex may be offset from first longitudinal axis 36 (FIG. 4G) if design requirements so require.

Figure 5A:
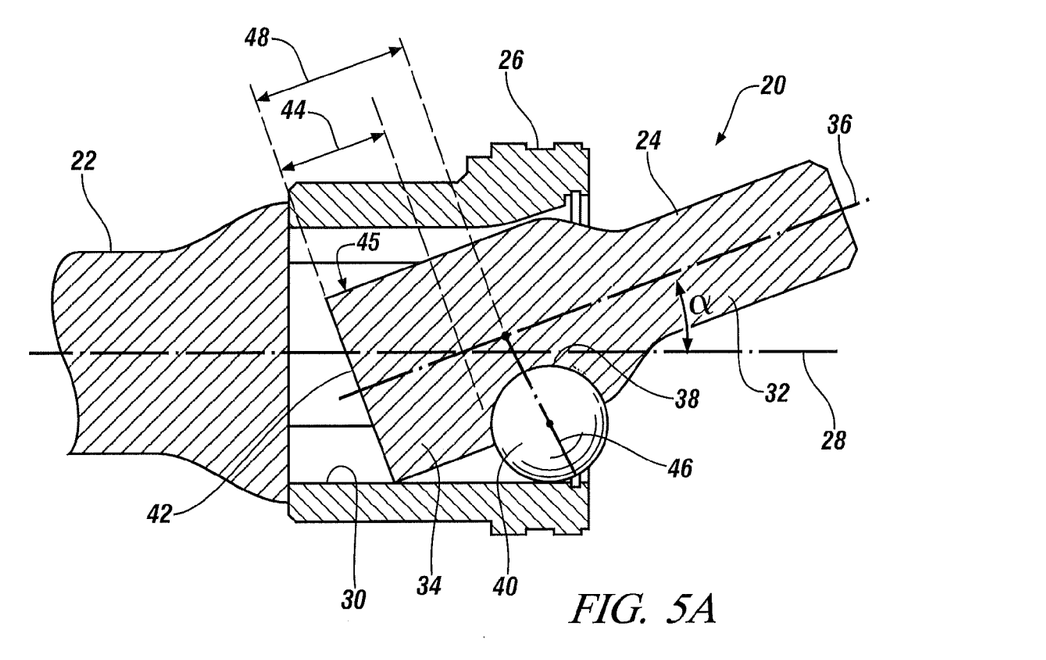
FIGS. 5A-C are partial cross-sectional views of other exemplary embodiments of pocket ends and CV joints as disclosed herein in an articulated configuration.
Figure 5B:
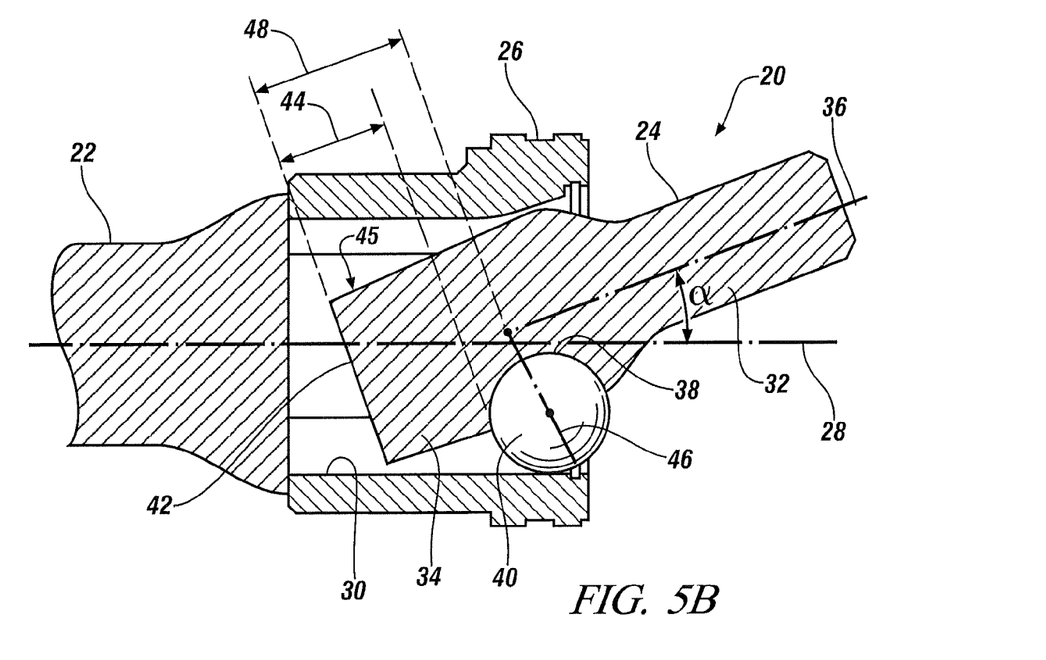

The curved surface 50 comprising distal end surface 42 ensures that the first shaft 22 is able to articulate within the joint housing 26 even if the first shaft 22 is fully stroked inwardly within the joint housing 26. Accordingly, in the event that the first shaft 22 is fully stroked into the joint housing 26 and is disposed in abutting engagement with a base 29 of the joint housing 26, i.e., the distal end surface 42 is resting on the base 29 of the joint housing 26, the convex surface 50 permits articulation, i.e., angulation, of the first shaft 22 relative to the second shaft 24. Accordingly, the first shaft 22 is free to float into the fully stroked position, as may occur when first shaft 22 includes an inboard CV joint 20 on one end and an outboard CV joint 20 on an opposite end, and is and still articulate relative to the respective second shaft 24 without causing the failure of or damage to the CV joint 20 that has floated into this position. In an exemplary embodiment, the curved surface 50 may provide a range of angular movement of the first shaft 22 relative to the second shaft 24 of about 0 to about 25°, or a maximum joint angle ($\alpha$), FIG. 5, of about 25°. It will be understood that the selection of the convex surface 50 and its axial location as described herein, in addition to providing the predetermined range of angulation at full inward stroke of first shaft 22, may also be used to provide a predetermined range or maximum amount of stroke or axial movement of first shaft 22 relative to second shaft 24 for a given joint housing 26. Alternately, for a given first shaft 22 and first pocket end 34, including convex surface 50, second shaft 24 and joint housing 26, particularly the length of bore 27 and location of base 29, may be selected to provide a predetermined range or maximum amount of stroke or axial movement of first shaft 22 relative to second shaft 24.

As illustrated in FIG. 5, in order to provide a predetermined range or maximum amount of angular movement of first shaft 22 relative to second shaft 24, and, more particularly, to provide a range or maximum wherein first shaft 22 acts to self-limit or prevent over-articulation of the CV joint 20 and thereby prevent failure of or damage to the joint, the first pocket end 34 of the first shaft 22 may include an extension 44 disposed between the pockets 38 and the distal end surface 42 of first shaft 22. As such, the pocket end 34 of the first shaft 22 is axially extended along the first longitudinal axis 36. In other words, the pocket end 34 extends beyond the plurality of pockets 38 from the pockets 38 to a distal end of the first shaft 22, along the first longitudinal axis 36.

As the first shaft 22 and the second shaft 24 rotate about the first longitudinal axis 36 and the second longitudinal axis 28 respectively, as well as articulate relative to each other, the extension 44 orbits about the first longitudinal axis 36 within the joint housing 26. The extension 44 has a predetermined length 48, calculated to contact the inner diameter or bore 27 of the joint housing 26 when the first shaft 22 and the second shaft 24 are fully articulated relative to each other, i.e., when the first shaft 22 and the second shaft 24 are articulated at their maximum range of articulation or maximum joint angle ($\alpha$). As such, contact between the extension 44 of the first pocket end 34 and the bore 27 of the joint housing 26 prevents the first shaft 22 from articulating any further relative to the second shaft 24, thereby restraining the articulation between the first shaft 22 and the second shaft 24 to within the predetermined range of articulation or joint angles ($\alpha$). The extension 44 and predetermined length 48 may be selected to limit the articulation of the first shaft 22 and the second shaft 24 to the predetermined range of joint angles ($\alpha$) and prevent the axle portion 32 of first shaft 22 from being articulated into the end 23 of joint housing 26 and the creation of a bending moment at this location on first shaft 22. Further, extension 44 may be selected to limit the articulation of the first shaft 22 and the second shaft 24 to a predetermined range of joint angles ($\alpha$) that prevents the dislodgment of one or more of the drive balls 40 and consequent failure of the CV joint 20. In an exemplary embodiment, the extension 44 may be selected to provide a range of angular movement of the first shaft 22 relative to the second shaft 24 of about 0 to about 25°, or a maximum joint angle ($\alpha$), FIG. 5, of about 25°. Where bore 27 is cylindrical, this range of angular movement is substantially the same over the entire range of axial movement or stroke of first shaft 22 within joint housing 26. It will be understood that the selection of extension 44 and its predetermined axial length 48 as described herein, in addition to providing the predetermined range of angulation of first shaft 22, may also be used to provide a predetermined range or maximum amount of stroke or axial movement of first shaft 22 relative to second shaft 24 for a given joint housing 26. Alternately, for a given first shaft 22 and first pocket end 34, including extension 44 and its predetermined axial length 48, second shaft 24 and joint housing 26, particularly the length of bore 27 and location of base 29, may be selected to provide a predetermined range or maximum amount of stroke or axial movement of first shaft 22 relative to second shaft 24.

Figure 5C:
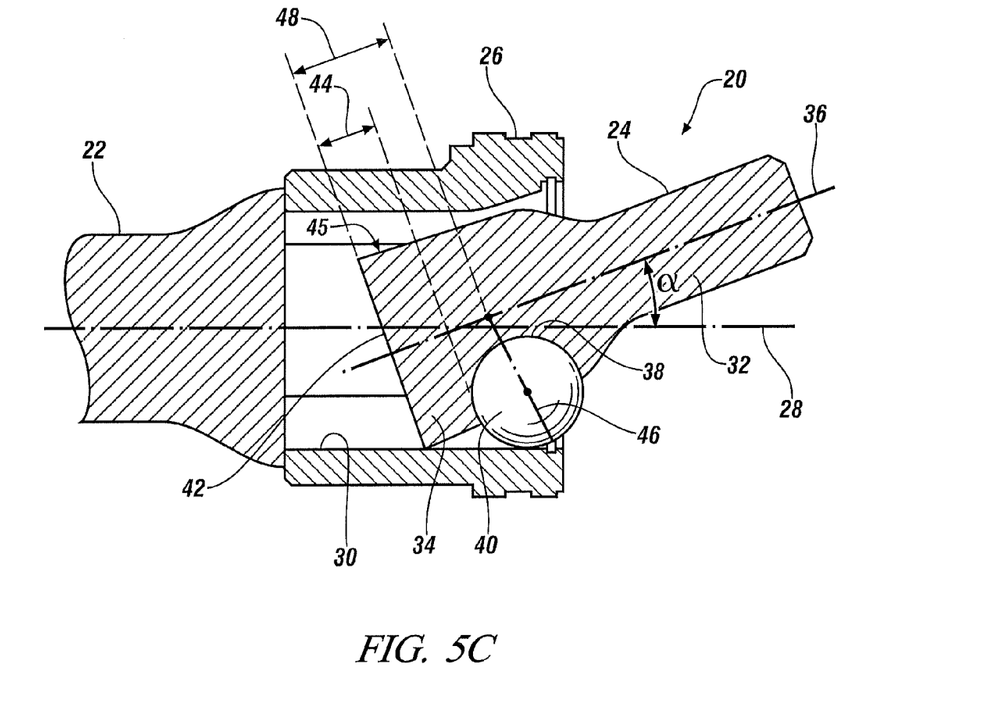

As illustrated in FIGS. 3-5C, extension 44 may include a right solid of revolution about first longitudinal axis 36. The solid of revolution may be described generally as a solid of revolution having an axis of revolution disposed on first longitudinal axis 36. In one exemplary embodiment, the solid of revolution comprises a right cylinder (FIG. 5A) having a surface generated by a straight line intersecting and moving along a closed plane curve (e.g., the curve defined by the periphery of distal end 42), the directrix, while remaining parallel to a fixed straight line that is not on or parallel to the plane of the directrix, in this case longitudinal axis 36. More particularly, the right cylinder may include a right circular cylinder. In another exemplary embodiment, extension 44 may comprise a frustoconical solid of revolution, wherein the sidewall 45 of extension 44 tapers inwardly (FIG. 5B) or outwardly (FIG. 5C).

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the present application.

What is claimed is:

1. A constant velocity joint, comprising:
 a first rotatable shaft having a first longitudinal axis, the first shaft comprising an axle portion having on one end thereof an enlarged pocket portion, the pocket portion having a plurality of circumferentially and radially spaced ball pockets formed therein and a distal end;
 a corresponding plurality of spherical balls disposed in the ball pockets; and
 a second rotatable shaft having a second longitudinal axis and comprising a joint housing disposed on an end thereof, the joint housing having a central bore with a corresponding plurality of axially extending, circumferentially and radially spaced ball grooves disposed therein about the second longitudinal axis and a base, the joint housing disposed over the pocket portion with the corresponding plurality of balls disposed in the ball grooves, thereby forming a joint that is configured to provide a range of angular movement and a range of axial movement of the first shaft relative to the second shaft, the distal end of the pocket portion having a convex surface comprising an elliptical surface, parabolic surface, or convex surface of complex curvature comprising a curved path formed from a combination of an arc or a line revolved about the first longitudinal axis, or a combination of the foregoing surfaces, which is configured to provide a predetermined a range of angular movement when the joint is fully stroked inwardly and the distal end is in touching contact with the base.

2. The constant velocity joint of claim 1, wherein the convex surface extends from the pockets.

3. A constant velocity joint, comprising:
 a first rotatable shaft having a first longitudinal axis, the first shaft comprising an axle portion having on one end thereof an enlarged pocket portion, the pocket portion having a plurality of circumferentially and radially spaced ball pockets formed therein and a distal end;
 a corresponding plurality of spherical balls disposed in the ball pockets; and a second rotatable shaft having a second longitudinal axis and comprising a joint housing disposed on an end thereof, the joint housing having a central bore with a corresponding plurality of axially extending, circumferentially and radially spaced ball grooves disposed therein about the second longitudinal axis and a base, the joint housing disposed over the pocket portion with the corresponding plurality of balls disposed in the ball grooves, thereby forming a joint that is configured to provide a range of angular movement and a range of axial movement of the first shaft relative to the second shaft, the distal end of the pocket portion having a convex surface that is configured to provide a predetermined a range of angular movement when the joint is fully stroked inwardly and the distal end is in touching contact with the base, wherein the pocket portion comprises an extension having a substantially constant cross-sectional area that extends from the ball pockets toward the distal end, and wherein the convex surface is disposed on the extension.

4. The constant velocity joint of claim 3, wherein the convex surface comprises a spherical surface, elliptical surface, parabolic surface, or convex surface of complex curvature comprising a curved path formed from a combination of an arc or a line revolved about the first longitudinal axis, or a combination of the foregoing surfaces.

5. The constant velocity joint of claim 3, wherein the convex surface has an apex.

6. The constant velocity joint of claim 4, wherein the apex is located on the first longitudinal axis.

7. The constant velocity joint of claim 3, wherein the apex is offset from the first longitudinal axis.

8. The constant velocity joint of claim 3, wherein the predetermined range of angular movement when the joint is fully inwardly stroked is about 0 to about 25°.

9. The constant velocity joint of claim 3, wherein the extension has a length from a pocket center, and the length is selected to define a predetermined range of axial movement of the joint.

10. The constant velocity joint of claim 3, wherein the extension comprises a right solid of revolution having an axis disposed on the first longitudinal axis.

11. The constant velocity joint of claim 10, wherein the extension has constant or variable cross-sectional area that extends from the ball pockets to the distal end.

12. A constant velocity joint, comprising:
a first rotatable shaft having a first longitudinal axis, the first shaft comprising an axle portion having on one end thereof an enlarged pocket portion, the pocket portion having a plurality of circumferentially and radially spaced ball pockets formed therein and a distal end;
a corresponding plurality of spherical balls disposed in the ball pockets; and
a second rotatable shaft having a second longitudinal axis and comprising a joint housing disposed on an end thereof, the joint housing having a central bore with a corresponding plurality of axially extending, circumferentially and radially spaced ball grooves disposed therein about the second longitudinal axis and a base, the joint housing disposed over the pocket portion with the corresponding plurality of balls disposed in the ball grooves, thereby forming a moveable joint that is configured to provide a range of angular movement and a range of axial movement of the first shaft relative to the second shaft, the distal end of the pocket portion having a convex surface that is configured to provide a predetermined a range of angular movement when the joint is fully stroked inwardly and the distal end is in touching contact with the base, wherein the pocket portion comprises an extension having a variable cross-sectional area that extends from the ball pockets toward the distal end, and wherein the convex surface is disposed on the extension.

13. The constant velocity joint of claim 12, wherein the convex surface comprises a spherical surface, elliptical surface, parabolic surface, or convex surface of complex curvature comprising a curved path formed from a combination of an arc or a line revolved about the first longitudinal axis, or a combination of the foregoing surfaces.

14. The constant velocity joint of claim 12, wherein the extension comprises a right solid of revolution having an axis disposed on the first longitudinal axis.

15. The constant velocity joint of claim 14, wherein the right solid of revolution comprises a right cylinder having a cylindrical axis disposed on the first longitudinal axis.

16. The constant velocity joint of claim 14, wherein the right solid of revolution comprises a frustoconical solid of revolution.

17. The constant velocity joint of claim 12, wherein the predetermined range of angular movement is about 0 to about 25°.

18. The constant velocity joint of claim 12, wherein a maximum joint angle of the joint throughout the predetermined range of axial movement is substantially the same.

19. A constant velocity joint, comprising:
a first rotatable shaft having a first longitudinal axis, the first shaft comprising an axle portion having on one end thereof an enlarged pocket portion, the pocket portion having a plurality of circumferentially and radially spaced ball pockets formed therein, in a distal end and a frustoconical extension that tapers outwardly away from the first longitudinal axis toward the distal end;
a corresponding plurality of spherical balls disposed in the ball pockets; and
a second rotatable shaft having a second longitudinal axis and comprising a joint housing disposed on an end thereof, the joint housing having a central bore with a corresponding plurality of axially extending, circumferentially and radially spaced ball grooves disposed therein about the second longitudinal axis and a base, the joint housing disposed over the pocket portion with the corresponding plurality of balls disposed in the ball grooves, thereby forming a joint that is configured to provide a range of angular movement and a range of axial movement of the first shaft relative to the second shaft, the distal end of the pocket portion configured to provide a predetermined range of angular movement when the joint is fully stroked inwardly and the distal end is in touching contact with the base.

20. The constant velocity joint of claim 19, wherein the distal end comprises a plane orthogonal to the first longitudinal axis.

* * * * *